United States Patent
Yu

(10) Patent No.: US 9,229,196 B2
(45) Date of Patent: Jan. 5, 2016

(54) OPTICAL IMAGE CAPTURE MODULE

(71) Applicant: ABILITY OPTO-ELECTRONICS TECHNOLOGY CO., LTD., Taichung County (TW)

(72) Inventor: Hung-Kuo Yu, Taichung (TW)

(73) Assignee: ABILITY OPTO-ELECTRONICS TECHNOLOGY CO. LTD., Taichung (TW)

(*) Notice: Subject to any disclaimer, the term of this patent is extended or adjusted under 35 U.S.C. 154(b) by 0 days.

(21) Appl. No.: 14/496,587

(22) Filed: Sep. 25, 2014

(65) Prior Publication Data
US 2015/0338612 A1    Nov. 26, 2015

(30) Foreign Application Priority Data
May 26, 2014    (TW) .............................. 103118247 A

(51) Int. Cl.
*G02B 9/62* (2006.01)
*G02B 13/00* (2006.01)
*G02B 9/00* (2006.01)

(52) U.S. Cl.
CPC .............. *G02B 13/0045* (2013.01); *G02B 9/62* (2013.01); *G02B 9/00* (2013.01)

(58) Field of Classification Search
CPC .............. G02B 9/00; G02B 9/62; G02B 9/64; G02B 13/00; G02B 13/002; G02B 13/0015
USPC .......................................... 359/713, 754–757
See application file for complete search history.

(56) References Cited

U.S. PATENT DOCUMENTS

| | | | | |
|---|---|---|---|---|
| 2012/0229917 | A1* | 9/2012 | Huang | G02B 13/0045 359/713 |
| 2014/0211325 | A1* | 7/2014 | Lai | G02B 13/0045 359/713 |
| 2014/0218582 | A1* | 8/2014 | Chen | G02B 13/0045 348/335 |

* cited by examiner

*Primary Examiner* — Bumsuk Won
*Assistant Examiner* — William R Alexander
(74) *Attorney, Agent, or Firm* — Muncy, Geissler, Olds & Lowe, P.C.

(57) ABSTRACT

The present disclosure illustrates an optical image capture module comprising an optical lens assembly, an aperture stop and an image plane. The optical lens assembly in order from an object side toward an image side comprising: a first lens element, having positive refractive power and a convex object-side surface adjacent to the optical axis; a second lens element, a third lens element and a fourth lens element which have refractive power adjacent to the optical axis; a fifth lens element having refractive power and a concave image-side surface adjacent to the optical axis; a sixth lens element having negative refractive power and a convex surface image-side surface adjacent to the optical axis, at least one of the object-side surface and image-side surface of the sixth lens element being aspheric and having at least one inflection point located between the optical axis and the peripheral surface.

20 Claims, 13 Drawing Sheets

OPTICAL IMAGE CAPTURE MODULE

CROSS-REFERENCE TO RELATED APPLICATION

This application claims the benefit of Taiwan Patent Application No. 103118247, filed on May 26, 2014, in the Taiwan Intellectual Property Office, the disclosure of which is incorporated herein in its entirety by reference.

BACKGROUND OF THE INVENTION

1. Field of the Invention

The present disclosure relates to an optical image capture module, in particular, to a thin optical image capture module including six lens elements for high quality imaging in application of 3C product.

2. Description of the Related Art

Currently, an optical image capturing system is installed on a mobile phone, a game player, PC CAM, DSC, or DVC to capture an image from an object. The trend of the optical image capturing system gradually moves toward compact size and low cost, and the optical image capturing system must have excellent imaging quality with a good aberration correction ability and high resolution at the same time.

Traditional sphere lapping glass lens element can be made of lots of materials. Currently, the lens element made of glass material is widely used by industry because the glass material lens element is useful for correcting the chromatic aberration. However, when the sphere lapping glass lens element is applied to a small F-number and a large wide-angle, the correction of the chromatic aberration will become harder. To improve the drawback of the traditional sphere lapping glass lens element, current optical image capturing system has already used aspheric plastic lens element or aspheric molding glass lens element to obtain a better imaging quality. However, the structure of the above optical image capturing system usually needs a combination of more lens elements for getting the better imaging quality, resulting in an overlength of the optical image capturing system. Thus, the optical image capturing system is not satisfied with the features of compact size and low cost, and it cannot meet the requirement of thin and compact electronic products.

Therefore, what is need is to efficiently shorten the total length of the optical lens assembly and combine multiple sets of lenses to further improve quality of imaging.

SUMMARY OF THE INVENTION

An aspect of the embodiment of the present disclosure directs to an image capture module which utilizes the combination of refractive powers, convex surfaces and concave surfaces of six lens elements, to shorten the total length of the image capture module and improve imaging quality in application of the small electronic product.

An exemplary embodiment of the present disclosure provides an image capture module comprising an optical lens assembly, an aperture stop and an image plane. The optical lens assembly, in order from an object side toward an image side, includes a first lens element, a second lens element, a third lens element, a fourth lens element, a fifth lens element and a sixth lens element. The first lens element has positive refractive power and a convex object-side surface adjacent to the optical axis. The second lens element has refractive power adjacent to the optical axis. The third lens element has refractive power adjacent to the optical axis. The fourth lens element has refractive power adjacent to the optical axis. The fifth lens element has refractive power and a concave image-side surface adjacent to the optical axis. The sixth lens element has negative refractive power and a convex image-side surface adjacent to the optical axis, and at least one of the object-side surface and the image-side surface of the sixth lens element is aspheric, and at least one of the object-side surface and the image-side surface of the sixth lens element has at least one inflection point located between the optical axis and the peripheral surface. The image plane is for image formation for an object. The most height difference of the sixth lens element approaching the image-side surface and the optical axis being the center and within the diameter range of the aperture stop is S12H, the diameter of the aperture stop is AD, and they satisfy the relations: $|S12H/AD|*100<5.0$.

Preferably, focus length of the optical lens assembly is f, and they satisfy the relations: $0.1<AD/f<1.0$ Preferably, the focus length of the optical lens assembly is f, the half of the maximal field of view of the optical lens assembly is HFOV, and they satisfy the relations: $5.0<HFOV/f<20.0$.

Preferably, the most height difference of the fifth lens element approaching the image-side surface and the optical axis being the center and the diameter range of the aperture stop is S10H, the diameter of the aperture stop is AD, and they satisfy the relations: $|S10H/AD|*100<4.0$.

Preferably, the distance along the optical axis from the aperture stop to the image-side surface of the sixth lens element is STL, the distance along the optical axis from the object-side surface of the first lens element to the image-side surface of the sixth lens element is FL, and they satisfy the relations: $0.5<STL/FL<1.2$.

Preferably, the distance along the optical axis from the object-side surface of the first lens element to the image plane is TTL, the distance along the optical axis from the image-side surface of the sixth lens element to the image plane is BFL, and they satisfy the relations: $2.0<TTL/BFL<8.0$.

Preferably, the central thickness of the second lens element is ct2 and the second lens element has negative refractive power, the focus length of the optical lens assembly is f, and they satisfy the relations: $0<ct2/f<0.1$.

Preferably, the distance along the optical axis from the object-side surface of the first lens element to the image-side surface of the sixth lens element is FL, a sum of the central thickness of the first lens element, the second lens element, the third lens element, the fourth lens element, the fifth lens element and the sixth lens element is $\Sigma(ct)$, and they satisfy the relations: $0<\Sigma(ct)/FL<1$.

Preferably, the focus length of the optical lens assembly is f, the distance along the optical axis from the image-side surface of the first lens element to the object-side surface of the second lens element is T12, and they satisfy the relations: $0<T12/f<0.1$.

An exemplary embodiment of the present disclosure provides an image capture module comprising an optical lens assembly, an aperture stop and an image plane. The optical lens assembly, in order from an object side toward an image side, comprises a first lens element, a second lens element, a third lens element, a fourth lens element, a fifth lens element and a sixth lens element. The first lens element has positive refractive power and a convex object-side surface adjacent to the optical axis. The second lens element has refractive power adjacent to the optical axis. The third lens element has refractive power adjacent to the optical axis. The fourth lens element has refractive power adjacent to the optical axis. The fifth lens element has refractive power and a concave image-side surface adjacent to the optical axis, and at least one of the object-side surface and the image-side surface of the fifth lens element is aspheric, and at least one of the object-side surface and the image-side surface of the fifth lens element has at least one inflection point located between the optical axis and the peripheral surface. The sixth lens element having negative refractive power and a convex surface image-side surface adjacent to the optical axis, and at least one of the object-side surface and the image-side surface of the sixth lens element is aspheric, and at least one of the object-side surface and the image-side surface of the sixth lens element has at least one inflection point located between the optical axis and the peripheral surface. The image plane is for image formation for an object. A diagonal length of an imaging area formed on the image plane by the maximal field of view of the optical lens assembly is Dg, the diameter of the aperture stop is AD, and they satisfy the relations: 0.0<AD/Dg<0.5.

Preferably, the focus length of the optical lens assembly is f, the half of the maximal field of view of the optical lens assembly is HFOV, and they satisfy the relations: 5.0<HFOV/f<20.0.

Preferably, the most height difference of the fifth lens element approaching the image-side surface and the optical axis being the center and the diameter range of the aperture stop is S10H, and they satisfy the relations: |S10H/AD|*100<4.0.

Preferably, the distance along the optical axis from the aperture stop to the image-side surface of the sixth lens element is STL, the distance along the optical axis from the object-side surface of the first lens element to the image-side surface of the sixth lens element is FL, and they satisfy the relations: 0.5<STL/FL<1.2.

Preferably, the distance along the optical axis from the object-side surface of the first lens element to the image plane is TTL, the distance along the optical axis from the image-side surface of the sixth lens element to the image plane is BFL, and they satisfy the relations: 2.0<TTL/BFL<8.0.

Preferably, the central thickness of the second lens element is ct2 and the second lens element has negative refractive power, the focus length of the optical lens assembly is f, and they satisfy the relations: 0<ct2/f<0.1.

Preferably, the distance along the optical axis from the object-side surface of the first lens element to the image-side surface of the sixth lens element is FL, a sum of the central thickness of the first lens element, the second lens element, the third lens element, the fourth lens element, the fifth lens element and the sixth lens element is Σ(ct), and they satisfy the relations: 0<Σ(ct)/FL<1.

Preferably, the focus length of the optical lens assembly is f, the distance along the optical axis from the image-side surface of the first lens element to the object-side surface of the second lens element is T12, and they satisfy the relations: 0<T12/f<0.1.

An exemplary embodiment of the present disclosure provides an image capture module comprising an optical lens assembly, an aperture stop and an image plane. The optical lens assembly, in order from an object side toward an image side, comprises a first lens element, a second lens element, a third lens element, a fourth lens element, a fifth lens element and a sixth lens element. The first lens element has positive refractive power and a convex object-side surface adjacent to the optical axis. The second lens element has negative refractive power adjacent to the optical axis. The third lens element has refractive power adjacent to the optical axis. The fourth lens element has refractive power adjacent to the optical axis. The fifth lens element has refractive power and a concave image-side surface adjacent to the optical axis, and at least one of the object-side surface and the image-side surface of the fifth lens element is aspheric, and at least one of the object-side surface and the image-side surface of the fifth lens element has at least one inflection point located between the optical axis and the peripheral surface. The sixth lens element has negative refractive power and a convex surface image-side surface adjacent to the optical axis, and at least one of the object-side surface and the image-side surface of the sixth lens element is aspheric, and at least one of the object-side surface and the image-side surface of the sixth lens element has at least one inflection point located between the optical axis and the peripheral surface. The image plane is for image formation for an object. The focus length of the optical lens assembly is f, the half of the maximal field of view of the optical lens assembly is HFOV, the diameter of the aperture stop is AD, the diagonal length of an imaging area formed on the image plane by the maximal field of view of the optical lens assembly is Dg, the most height difference of the sixth lens element approaching the image-side surface and the optical axis being the center and the diameter range of the aperture stop is S12H, and they satisfy the relations: 5.0<HFOV/f<20.0, 0.1<AD/f<1.0, 0.0<AD/Dg<0.5, |S12H/AD|*100<5.0.

Preferably, the distance along the optical axis from the aperture stop to the image-side surface of the sixth lens element is STL, the distance along the optical axis from the object-side surface of the first lens element to the image-side surface of the sixth lens element is FL, the distance along the optical axis from the object-side surface of the from first lens element to the image plane is TTL, the distance along the optical axis from the image-side surface of the sixth lens element to the image plane is BFL, and they satisfy the relations: 2.0<TTL/BFL<8.0,0.5<STL/FL<1.2.

Preferably, the image capture module further comprises an electronic image sensor disposed on the image plane.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Figure 1:
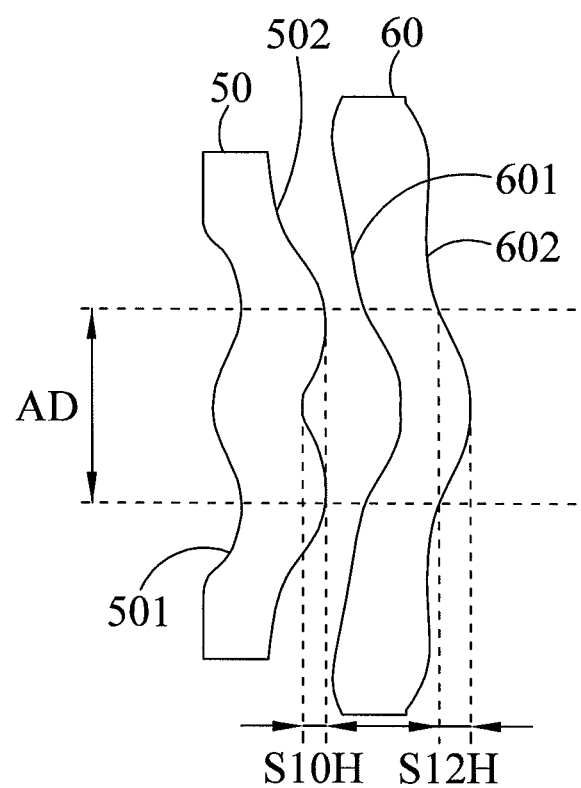
FIG. 1 is a schematic view of parameters "S10H" and "S12H" of the present disclosure.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Figure 2A:
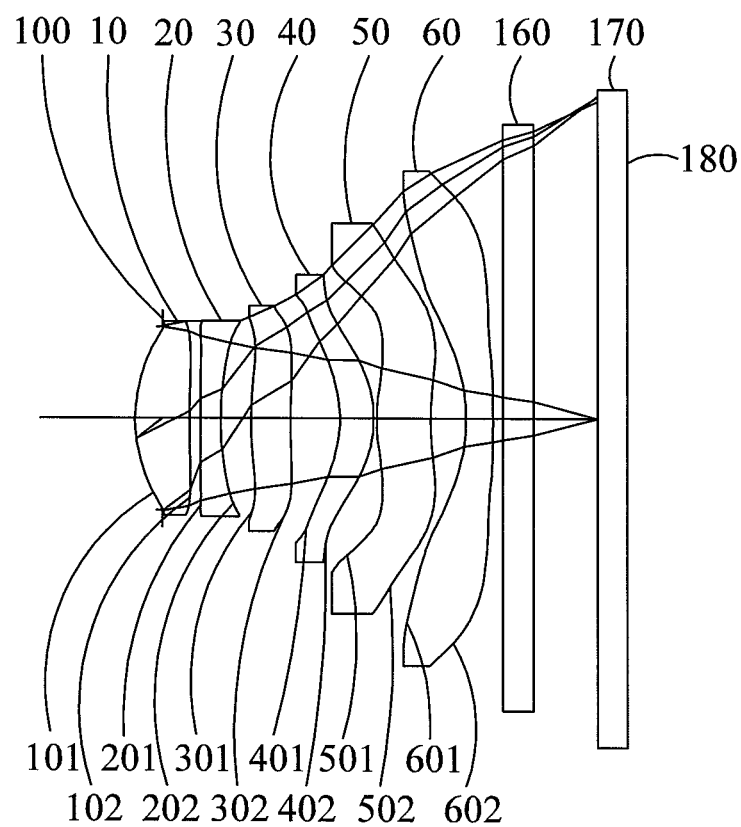
FIG. 2A is a schematic view of a first embodiment of an image capture module of the present disclosure.

Please refer to FIG. 1 and FIG. 2A. FIG. 1 is a schematic view of parameters "S10H" and "S12H" of the present disclosure. As shown in FIG. 1, S10H is the most height difference of the fifth lens element 50 approaching the image-side surface 502 and the optical axis being the center and within the diameter range of the aperture stop. S12H is the most height difference of the sixth lens element approaching the image-side surface and the optical axis being the center and within the diameter range of the aperture stop, where AD is the diameter of the aperture stop. FIG. 2A is a schematic view of minuteness a first embodiment of an image capture module of the present disclosure. As shown in FIG. 2A, the present disclosure comprises an optical lens assembly, in order from an object side toward an image side, comprises a first lens element 10, a second lens element 20, a third lens element 30, a fourth lens element 40, a fifth lens element 50, and a sixth lens element 60.

The first lens element 10 has positive refractive power and a convex object-side surface 101 adjacent to the optical axis. The second lens element 20 having positive refractive power is taken as an example in the first embodiment, but the present disclosure is not limited thereto. The embodiment can also be implemented by the second lens element 20 having negative refractive power. The third lens element 30 and the fourth lens element 40 have refractive power adjacent to the optical axis.

The fifth lens element 50 has refractive power and a concave image-side surface 502 adjacent to the optical axis, and at least one of the object-side surface 501 and the image-side surface 502 of the fifth lens element 50 is aspheric, and at least one of the object-side surface 501 and the image-side surface 502 of the fifth lens element 50 has at least one inflection point located between the optical axis and the peripheral surface. A sixth lens element 60 has negative refractive power and a convex surface image-side surface 602 adjacent to the optical axis, and at least one of the object-side surface 601 and the image-side surface 602 of the sixth lens element 60 is aspheric, and at least one of the object-side surface 601 and the image-side surface 602 of the sixth lens element 60 has at least one inflection point located between the optical axis and the peripheral surface. The aspheric optical surface of the present disclosure can be made in a shape not sphere, to obtain more control variables for decreasing aberration, and the number and total length of lenses used in the optical lens assembly can be reduced efficiently.

The image capture module of the present disclosure further comprises an aperture stop 100, an infrared cut-off filter 160. The aperture stop 100 is disposed between an object and the first lens element 10. The infrared cut-off filter 160 is disposed between the sixth lens element 60 and the image plane 170. In implementation, the infrared cut-off filter 160 is usually made of optical material and does not affect the focus length of the optical lens assembly of the present disclosure.

The image capture module further comprises an electronic image sensor 180 disposed on the image plane 170 for image formation for an object. The first lens element 10, the second lens element 20, the third lens element 30, the fourth lens element 40, the fifth lens element 50 and the sixth lens element 60 comprise plastic material or glass material. The aspheric equation of the present disclosure is:

$$z = ch^2/[1+[1-(k+1)c^2h^2]^{0.5}] + Ah^4 + Bh^6 + Ch^6 + Dh^{10} + Eh^{12} + Fh^{14} + Gh^{16} \pm Hh^{18} + Jh^{20} + \quad (1)$$

Wherein Z is a position value referring to a top of the surface at height h along optical axis direction, K is metric cone coefficient, C is the reciprocal of the radius of curvature, and A, B, C, D, E, F, G, H and J are high-order aspherical coefficients.

The optical data in the first embodiment is shown in table one, and the object-side surfaces and the image-side surfaces of the first lens element 10 to the sixth lens element 60 are made by the aspheric equation of the equation (1), and their aspheric parameters are shown in table two. The most height difference S12H of the sixth lens element 60 approaching the image-side surface and the optical axis being the center and within the diameter range of the aperture stop is 0.039 mm, the most height difference S10H of the fifth lens element 50 approaching the image-side surface and the optical axis being the center and the diameter range of the aperture stop is 0.040 mm, the diameter AD of the aperture stop is 1.817 mm, the focus length f of the optical lens assembly is 3.726 mm, HFOV which is the half of the maximal field of view of the optical lens assembly, is 39.67°, the distance STL along the optical axis from the aperture stop to the image-side surface of the sixth lens element 60 is 3.261 mm, the distance FL along the optical axis from the object-side surface of the first lens element 10 to the image-side surface of the sixth lens element 60 is 3.531 mm, the distance TTL along the optical axis from the object-side surface of the from first lens element to the image plane is 4.563 mm, the distance BFL along the optical axis from the image-side surface of the sixth lens element 60 to the image plane is 1.031 mm. the diagonal length of an imaging area formed on the image plane by the maximal field of view of the optical lens assembly Dg is 6.370 mm, the central thickness ct2 of the second lens element is 0.193 mm, the sum Σ(ct) of the central thickness of the first lens element, the second lens element, the third lens element, the fourth lens element, the fifth lens element and the sixth lens element is 2.268 mm, the distance T12 along the optical axis from the image-side surface of the first lens element 10 to the object-side surface of the second lens element 20 is 0.113 mm, |S12H/AD|*100=2.15, |S10H/AD|*100=2.20, AD/f=0.488, HFOV/f=10.647, STL/FL=0.9235, TTL/BFL=4.426, AD/Dg=0.286, ct2/f=0.052, Σ(ct)/FL=0.642, T12/f=0.030.

TABLE ONE basic data of lenses of the first embodiment
Basic data of lenses of the first embodiment

| Surface # | | Curvature Radius (mm) | Thickness/ Interval (mm) | Index (Nd) | Abbe# (Vd) |
|---|---|---|---|---|---|
| Aperture stop | | ∞ | −0.270 | | |
| First lens element | First surface | 1.540 | 0.539 | 1.534 | 56.072 |
| | Second surface | 7.591 | 0.113 | | |
| Second lens element | Third surface | 5.725 | 0.193 | 1.642 | 22.465 |
| | Fourth surface | 2.265 | 0.300 | | |
| Third lens element | Fifth surface | 2.962 | 0.393 | 1.534 | 56.072 |
| | Sixth surface | 10.866 | 0.482 | | |
| Fourth lens element | Seventh surface | −1.106 | 0.334 | 1.544 | 56.093 |
| | Eighth surface | −1.094 | 0.027 | | |
| Fifth lens element | Ninth surface | 1.752 | 0.537 | 1.534 | 56.072 |
| | Tenth surface | 2.390 | 0.341 | | |
| Sixth lens element | Eleventh surface | −1.887 | 0.272 | 1.544 | 56.093 |
| | Twelfth surface | −11.108 | 0.100 | | |
| Filter | Thirteenth surface | ∞ | 0.300 | 1.516 | 64.167 |
| | Fourteen surface | ∞ | 0.632 | | |

TABLE TWO the aspheric parameters of the first embodiment

| | Surface # | | | | | |
|---|---|---|---|---|---|---|
| | 1 | 2 | 3 | 4 | 5 | 6 |
| k | −0.2116 | 0.0000 | 0.0000 | −9.8254 | 0.8726 | 0.0000 |
| A | −0.0013 | −0.2303 | −0.5323 | −0.3245 | −0.1750 | −0.0358 |
| B | 0.0797 | 0.5869 | 1.4822 | 1.0402 | 0.0926 | −0.1134 |
| C | −0.4888 | −1.4233 | −2.7315 | −1.4067 | −0.3250 | 0.1181 |
| D | 1.3691 | 2.7158 | 4.0390 | 1.1040 | 0.4558 | −0.2485 |
| E | −2.0903 | −3.5691 | −4.5028 | −0.4114 | −0.2679 | 0.2941 |
| F | 1.6213 | 2.5225 | 2.9954 | −0.0034 | −0.2347 | −0.2723 |
| G | −0.5351 | −0.7261 | −0.8225 | 0.0570 | 0.2537 | 0.1179 |
| H | 0 | 0 | 0 | 0 | 0 | 0 |
| J | 0 | 0 | 0 | 0 | 0 | 0 |

| | Surface # | | | | | |
|---|---|---|---|---|---|---|
| | 7 | 8 | 9 | 10 | 11 | 12 |
| k | −1.2914 | −3.0276 | 0.1907 | −0.3154 | −0.4111 | 0.0000 |
| A | 0.4435 | −0.1442 | −0.4816 | −0.3189 | −0.0289 | −0.0350 |
| B | −1.0845 | −0.0072 | 0.3765 | 0.1121 | 0.0278 | 0.0707 |
| C | 1.5409 | 0.1405 | −0.3726 | −0.0217 | 0.0287 | −0.0468 |
| D | −0.8670 | −0.0257 | 0.2986 | −0.0046 | −0.0231 | 0.0151 |
| E | −0.2283 | −0.0276 | −0.2057 | 0.0048 | 0.0066 | −0.0026 |
| F | 0.4519 | 0.0098 | 0.0836 | −0.0011 | −0.0008 | 0.0002 |
| G | −0.1353 | −0.0006 | −0.0131 | 8.9251e−005 | 4.4062e−005 | −8.9094e−006 |
| H | 0 | 0 | 0 | 0 | 0 | 0 |
| J | 0 | 0 | 0 | 0 | 0 | 0 |

Figure 2B:
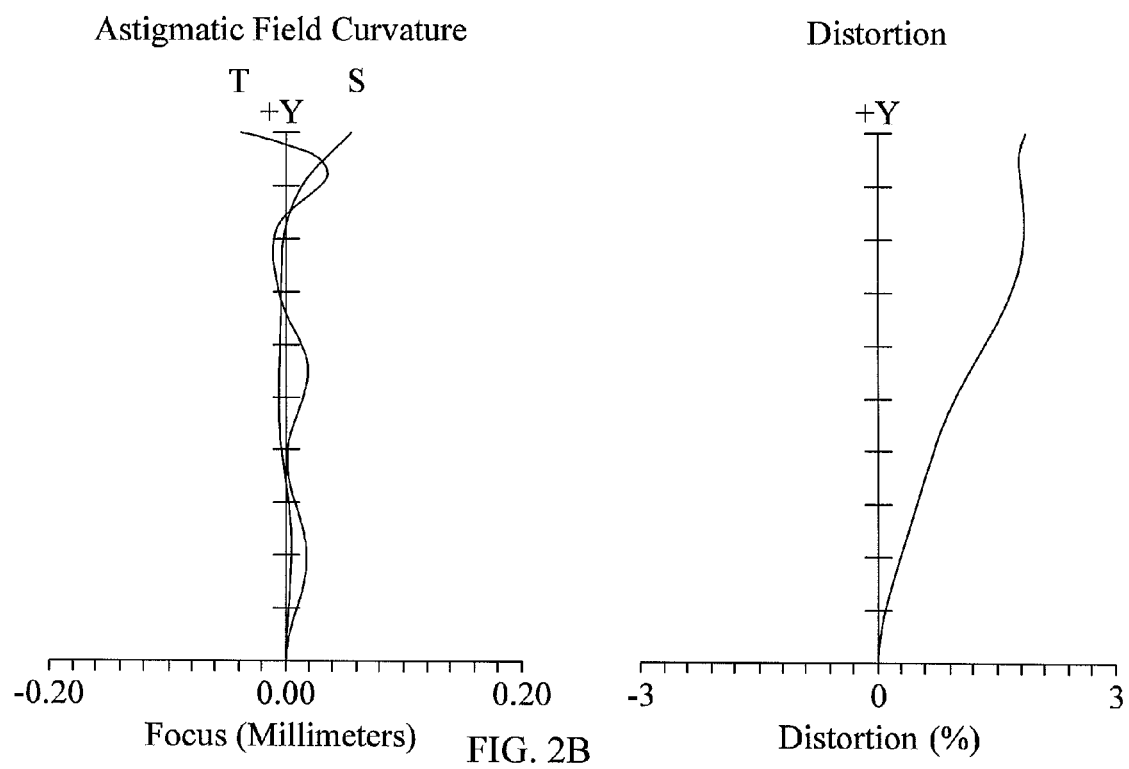
FIG. 2B is a curve diagram of the astigmatism and the distortion of the first embodiment of the present disclosure.
Figure 2C:
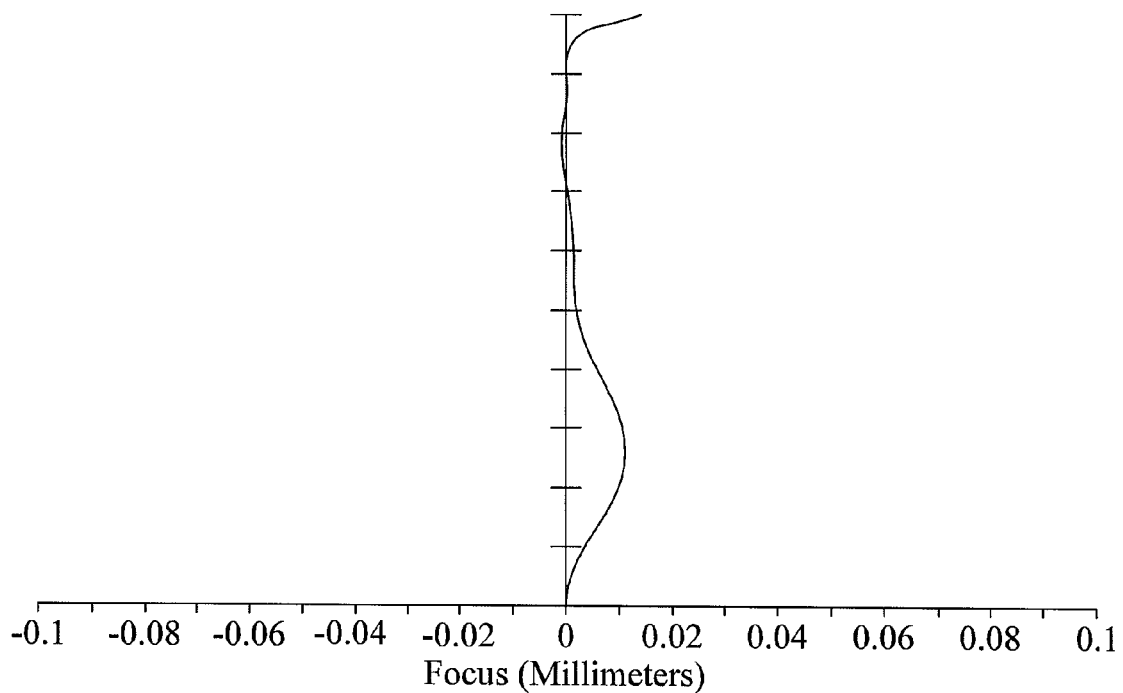
FIG. 2C is a curve diagram of the spherical aberration of the first embodiment of the present disclosure.

According to the basic data of lenses in table one and the aberration curve shown in FIG. 2B and FIG. 2C, the exemplary embodiment of the optical image capture module of the present disclosure minuteness has fine compensation for astigmatism, distortion, and spherical aberration.

Figure 3A:
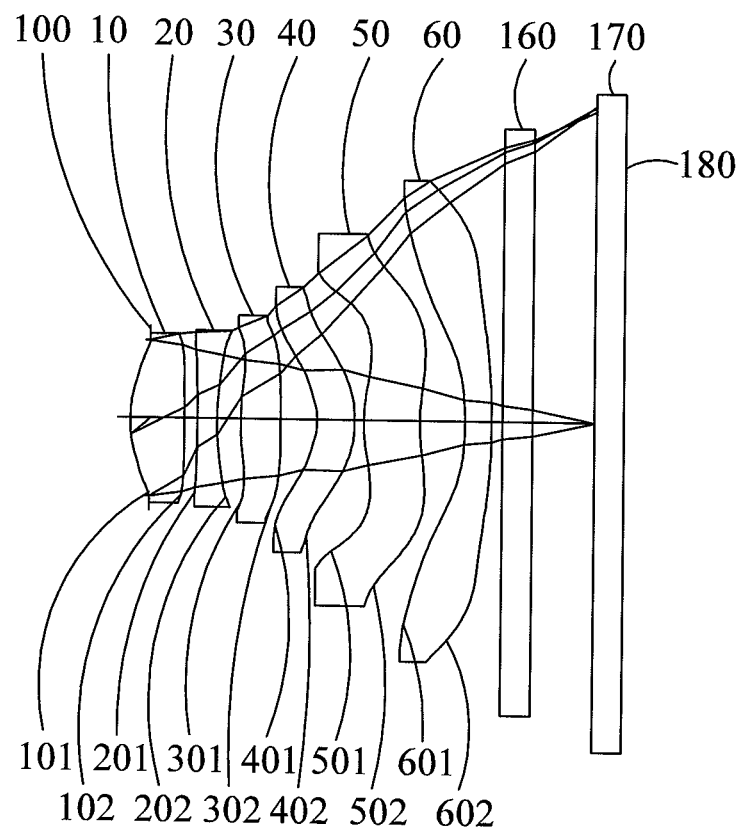
FIG. 3A is a schematic view of a second embodiment of the image capture module of the present disclosure.

Please refer to FIG. 3A which is a schematic view of a second embodiment of an optical image capture module of the present disclosure. As shown in FIG. 3A, the structures of lenses of the second embodiment are similar to that of the first embodiment, but their differences are in the optical data shown in table three. The object-side surfaces and the image-side surfaces of the first lens element 10 to the sixth lens element 60 are made by the aspheric equation of the equation (1). The aspheric parameters are shown in table four.

The most height difference S12H of the sixth lens element 60 approaching the image-side surface and the optical axis being the center and within the diameter range of the aperture stop is 0.052 mm, the most height difference S10H of the fifth lens element 50 approaching the image-side surface and the optical axis being the center and the diameter range of the aperture stop is 0.050 mm, the diameter AD of the aperture stop is 1.564 mm, the focus length f of the optical lens assembly is 3.754 mm, the HFOV which is the half of the maximal field of view of the optical lens assembly, is 39.60°, the distance STL along the optical axis from the aperture stop to the image-side surface of the sixth lens element 60 is 3.404 mm, the distance FL along the optical axis from the object-side surface of the first lens element 10 to the image-side surface of the sixth lens element 60 is 3.594 mm, the distance TTL along the optical axis from the object-side surface of the from first lens element to the image plane is 4.610 mm, the distance BFL along the optical axis from the image-side surface of the sixth lens element 60 to the image plane is 1.016 mm, the diagonal length of an imaging area formed on the image plane by the maximal field of view of the optical lens assembly Dg is 6.330 mm, the central thickness ct2 of the second lens element is 0.195 mm, the sum Σ(ct) of the central thickness of the first lens element, the second lens element, the third lens element, the fourth lens element, the fifth lens element and the sixth lens element is 2.329 mm, the distance T12 along the optical axis from the image-side surface of the first lens element 10 to the object-side surface of the second lens element 20 is 0.130 mm, and |S12H/AD|*100=3.32, |S10H/AD|*100=3.20, AD/f=0.417, HFOV/f=10.549, STL/FL=0.947, TTL/BFL=4.537, AD/Dg=0.247, ct2/f=0.052, Σ(ct)/FL=0.648, T12/f=0.035.

TABLE THREE basic data of lenses of the second embodiment.
Basic data of lenses of the second embodiment

| Surface # | | Curvature Radius (mm) | Thickness/ Interval (mm) | Index (Nd) | Abbe# (Vd) |
|---|---|---|---|---|---|
| Aperture stop | | ∞ | −0.190 | | |
| First lens element | First surface | 1.537 | 0.534 | 1.534 | 56.072 |
| | Second surface | 12.986 | 0.130 | | |
| Second lens element | Third surface | 9.539 | 0.195 | 1.642 | 22.465 |
| | Fourth surface | 2.370 | 0.242 | | |
| Third lens element | Fifth surface | 3.173 | 0.397 | 1.534 | 56.072 |
| | Sixth surface | −15.547 | 0.351 | | |
| Fourth lens element | Seventh surface | −0.820 | 0.381 | 1.544 | 56.093 |
| | Eighth surface | −1.024 | 0.090 | | |
| Fifth lens element | Ninth surface | 1.668 | 0.557 | 1.534 | 56.072 |
| | Tenth surface | 2.127 | 0.449 | | |
| Sixth lens element | Eleventh surface | −2.340 | 0.265 | 1.544 | 56.093 |
| | Twelfth surface | −8.751 | 0.1 | | |
| Filter | Thirteenth surface | ∞ | 0.3 | 1.516 | 64.167 |
| | Fourteen surface | ∞ | 0.616 | | |

TABLE FOUR the aspheric parameters of the second embodiment

| | Surface # | | | | |
|---|---|---|---|---|---|
| 1 | 2 | 3 | 4 | 5 | 6 |

| | 1 | 2 | 3 | 4 | 5 | 6 |
|---|---|---|---|---|---|---|
| k | −0.5000 | 0.0000 | 0.0000 | 0.0000 | 0.0000 | 0.0000 |
| A | 0.0045 | −0.2485 | −0.5345 | −0.4773 | −0.2085 | −0.0381 |
| B | −0.0077 | 0.5788 | 1.4670 | 1.3247 | −0.0116 | −0.2570 |
| C | −0.1950 | −1.9050 | −2.3895 | −1.8392 | 0.3197 | 0.3006 |
| D | 0.9105 | 4.7060 | 2.9153 | 1.6451 | −1.2171 | −0.1941 |
| E | −2.4265 | −8.2019 | −3.5896 | −1.4056 | 2.2053 | 0.1792 |
| F | 2.9345 | 7.9034 | 3.6913 | 1.3304 | −2.7135 | −0.2904 |
| G | −1.4567 | −3.1484 | −1.6775 | −0.6225 | 1.4481 | 0.1865 |
| H | 0 | 0 | 0 | 0 | 0 | 0 |
| J | 0 | 0 | 0 | 0 | 0 | 0 |

| | Surface # | | | | |
|---|---|---|---|---|---|
| 7 | 8 | 9 | 10 | 11 | 12 |

| | 7 | 8 | 9 | 10 | 11 | 12 |
|---|---|---|---|---|---|---|
| k | −1.0000 | −1.0000 | −1.0000 | 0.0000 | 0.0000 | 0.0000 |
| A | 0.4891 | 0.0463 | −0.4348 | −0.3227 | −0.0824 | −0.0897 |
| B | −1.2704 | −0.1772 | 0.2719 | 0.0760 | 0.0572 | 0.1117 |
| C | 1.9763 | 0.3148 | −0.2411 | 0.0244 | 0.0187 | −0.0586 |
| D | −1.1121 | −0.0692 | 0.2452 | −0.0407 | −0.0221 | 0.0167 |
| E | −0.0593 | −0.0609 | −0.2286 | 0.0182 | 0.0069 | −0.0027 |
| F | 0.2766 | 0.0208 | 0.1072 | −0.0033 | −0.0009 | 0.0002 |
| G | −0.0759 | 0.0002 | −0.0177 | 0.0002 | 5.2311e−005 | −9.6578e−006 |
| H | 0 | 0 | 0 | 0 | 0 | 0 |
| J | 0 | 0 | 0 | 0 | 0 | 0 |

Figure 3B:
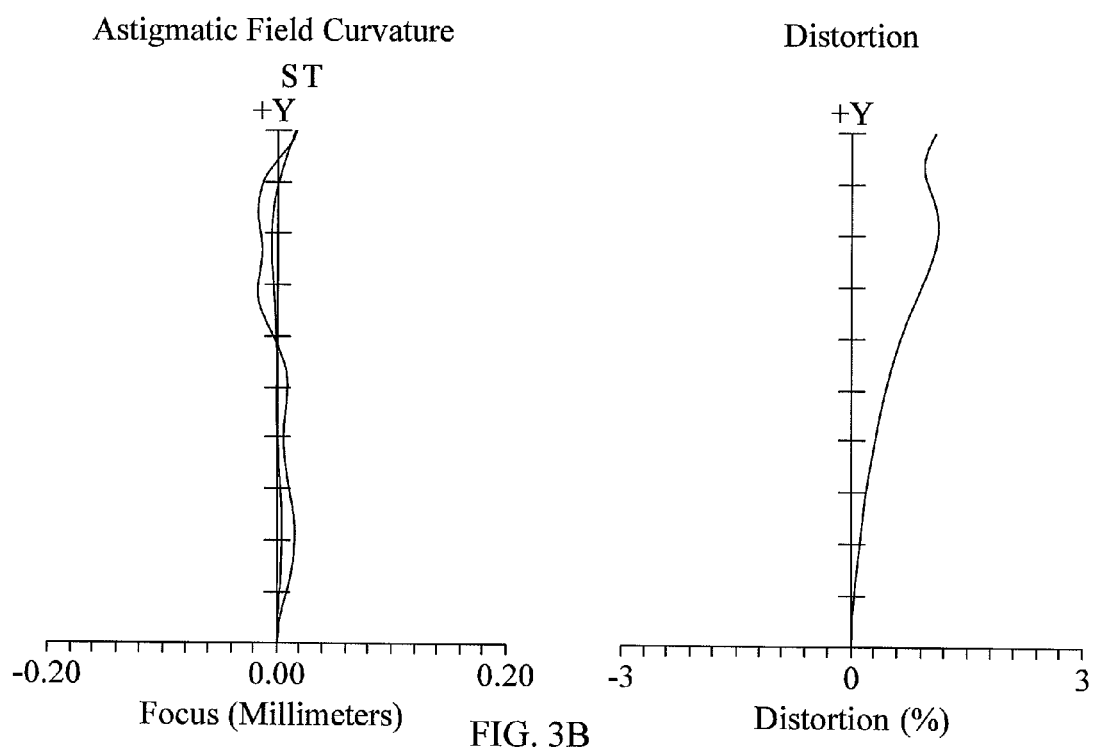
FIG. 3B is a curve diagram of the astigmatism and the distortion of the second embodiment of the present disclosure.
Figure 3C:
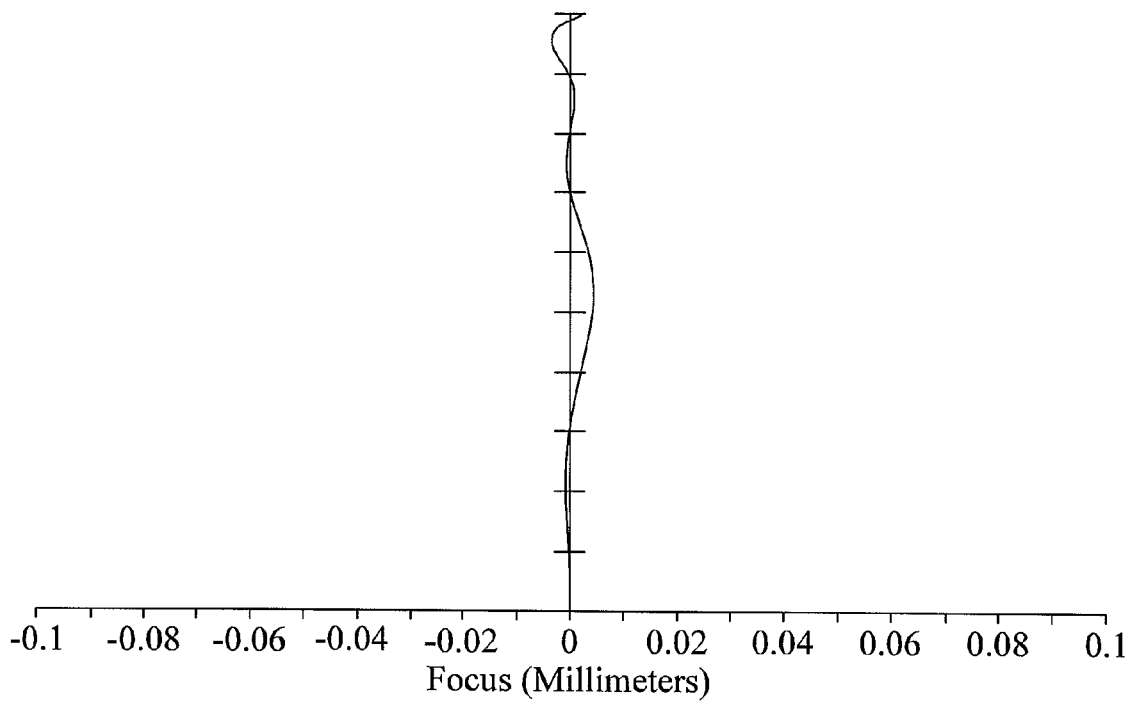
FIG. 3C is a curve diagram of the spherical aberration of the second embodiment of the present disclosure.

According to the basic data of lenses in table three and the aberration curves shown in FIG. 3B and FIG. 3C, the exemplary embodiment of the optical image capture module of the present disclosure has fine compensation for astigmatism, distortion, and spherical aberration.

Figure 4A:
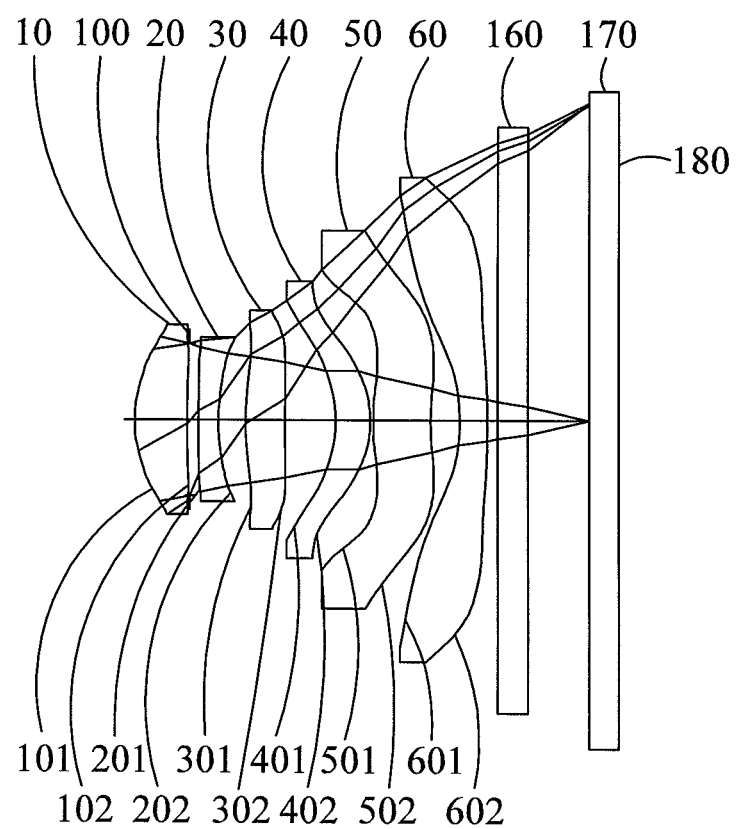
FIG. 4A is a schematic view of a third embodiment of the image capture module of the present disclosure.

Please refer to FIG. 4A which is a schematic view of minuteness a third embodiment of the optical image capture module of the present disclosure. As shown in FIG. 4A, the structure of lenses of the third embodiment is similar to that of the first embodiment, but their difference in the optical data shown in table five and the aperture stop 100 is disposed between the first lens element 10 and the second lens element 20. The object-side surfaces and the image-side surfaces of the first lens element 10 to the sixth lens element 60 are made by the aspheric equation of the equation (1), and their aspheric parameters are shown in table six.

The most height difference S12H of the sixth lens element 60 approaching the image-side surface and the optical axis being the center and within the diameter range of the aperture stop is 0.031 mm, the most height difference S10H of the fifth lens element 50 approaching the image-side surface and the optical axis being the center and the diameter range of the aperture stop is 0.030 mm, the diameter AD of the aperture stop is 1.540 mm, the focus length f of the optical lens assembly is 3.752 mm, the HFOV which is the half of the maximal field of view of the optical lens assembly, is 39.64°, the distance STL along the optical axis from the aperture stop to the image-side surface of the sixth lens element 60 is 2.985 mm, the distance FL along the optical axis from the object-side surface of the first lens element 10 to the image-side surface of the sixth lens element 60 is 3.537 mm, the distance TTL along the optical axis from the object-side surface of the from first lens element to the image plane is 4.558 mm, the distance BFL along the optical axis from the image-side surface of the sixth lens element 60 to the image plane is 1.020 mm, the diagonal length of an imaging area formed on the image plane by the maximal field of view of the optical lens assembly Dg is 6.370 mm, the central thickness ct2 of the second lens element is 0.199 mm, the sum Σ(ct) of the central thickness of the first lens element, the second lens element, the third lens element, the fourth lens element, the fifth lens element and the sixth lens element is 2.321 mm, the distance T12 along the optical axis from the image-side surface of the first lens element 10 to the object-side surface of the second lens element 20 is 0.113 mm, |S12H/AD|*100=2.01, |S10H/AD|*100=1.95, AD/f=0.410, HFOV/f=10.565, STL/FL=0.844, TTL/BFL=4.469, AD/Dg=0.242, ct2/f=0.053, Σ(ct)/FL=0.656, T12/f=0.030.

TABLE FIVE basic data of lenses of the third embodiment
Basic data of lenses of the third embodiment

| Surface # | | Curvature Radius (mm) | Thickness/ Interval (mm) | Index (Nd) | Abbe# (Vd) |
|---|---|---|---|---|---|
| First lens element | First surface | 1.469 | 0.523 | 1.534 | 56.072 |
| | Second surface | 6.837 | 0.030 | | |
| Aperture stop | | ∞ | 0.083 | | |
| Second lens element | Third surface | 4.456 | 0.199 | 1.642 | 22.465 |
| | Fourth surface | 1.924 | 0.276 | | |
| Third lens element | Fifth surface | 2.888 | 0.393 | 1.534 | 56.072 |
| | Sixth surface | 11.539 | 0.513 | | |
| Fourth lens element | Seventh surface | −1.083 | 0.346 | 1.544 | 56.093 |
| | Eighth surface | −1.029 | 0.024 | | |
| Fifth lens element | Ninth surface | 2.095 | 0.580 | 1.534 | 56.072 |
| | Tenth surface | 2.654 | 0.290 | | |
| Sixth lens element | Eleventh surface | −1.846 | 0.280 | 1.544 | 56.093 |
| | Twelfth surface | −9.373 | 0.100 | | |
| Filter | Thirteenth surface | ∞ | 0.300 | 1.516 | 64.167 |
| | Fourteen surface | ∞ | 0.620 | | |

TABLE SIX the aspheric parameters of the third embodiment

| | Surface # | | | | | |
|---|---|---|---|---|---|---|
| | 1 | 2 | 3 | 4 | 5 | 6 |
| k | −0.3201 | 0.0000 | 0.0000 | −8.3551 | −1.1946 | 0.0000 |
| A | 0.0009 | −0.2251 | −0.4997 | −0.2735 | −0.1763 | −0.0584 |
| B | 0.0861 | 0.6487 | 1.4696 | 1.0758 | 0.1585 | −0.0727 |
| C | −0.4526 | −1.5036 | −2.6660 | −1.5218 | −0.3484 | 0.0935 |
| D | 1.2895 | 2.7037 | 3.8917 | 1.2554 | 0.4161 | −0.2484 |
| E | −2.0850 | −3.5242 | −4.6215 | −0.3587 | −0.1765 | 0.3244 |
| F | 1.7588 | 2.4850 | 3.3399 | −0.2836 | −0.1469 | −0.2657 |
| G | −0.6480 | −0.7144 | −0.9965 | 0.2332 | 0.1416 | 0.1008 |
| H | 0 | 0 | 0 | 0 | 0 | 0 |
| J | 0 | 0 | 0 | 0 | 0 | 0 |

| | Surface # | | | | | |
|---|---|---|---|---|---|---|
| | 7 | 8 | 9 | 10 | 11 | 12 |
| k | −0.7408 | −2.1450 | 0.6209 | 0.0413 | −0.3964 | 0.0000 |
| A | 0.3720 | −0.1418 | −0.4602 | −0.3309 | −0.0208 | −0.0243 |
| B | −0.9994 | −0.0371 | 0.3820 | 0.1167 | 0.0272 | 0.0671 |
| C | 1.5016 | 0.1502 | −0.3813 | −0.0226 | 0.0288 | −0.0464 |
| D | −0.8642 | −0.0193 | 0.2982 | −0.0047 | −0.0232 | 0.0152 |
| E | −0.2131 | −0.0271 | −0.2048 | 0.0049 | 0.0066 | −0.0027 |
| F | 0.4547 | 0.0091 | 0.0839 | −0.0011 | −0.0008 | 0.0002 |
| G | −0.1403 | −0.0009 | −0.0131 | 8.6968e−005 | 4.4686e−005 | −8.7365e−006 |
| H | 0 | 0 | 0 | 0 | 0 | 0 |
| J | 0 | 0 | 0 | 0 | 0 | 0 |

Figure 4B:
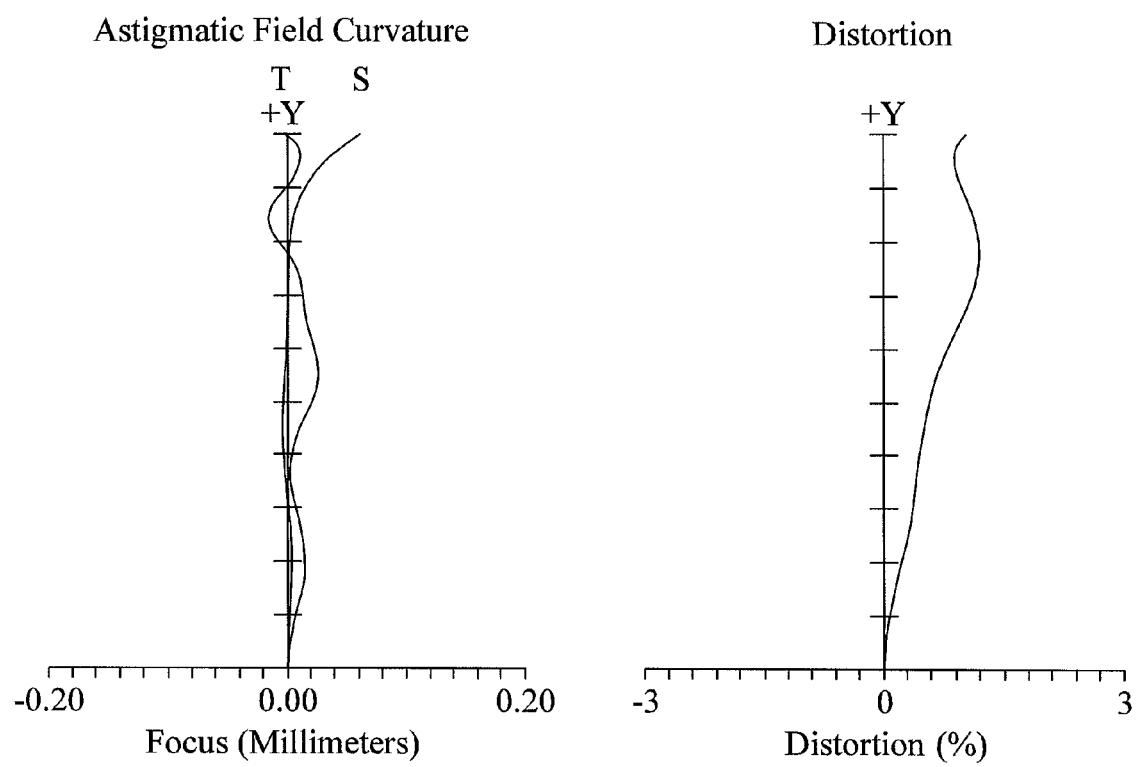
FIG. 4B is a curve diagram of the astigmatism and the distortion of the third embodiment of the present disclosure.
Figure 4C:
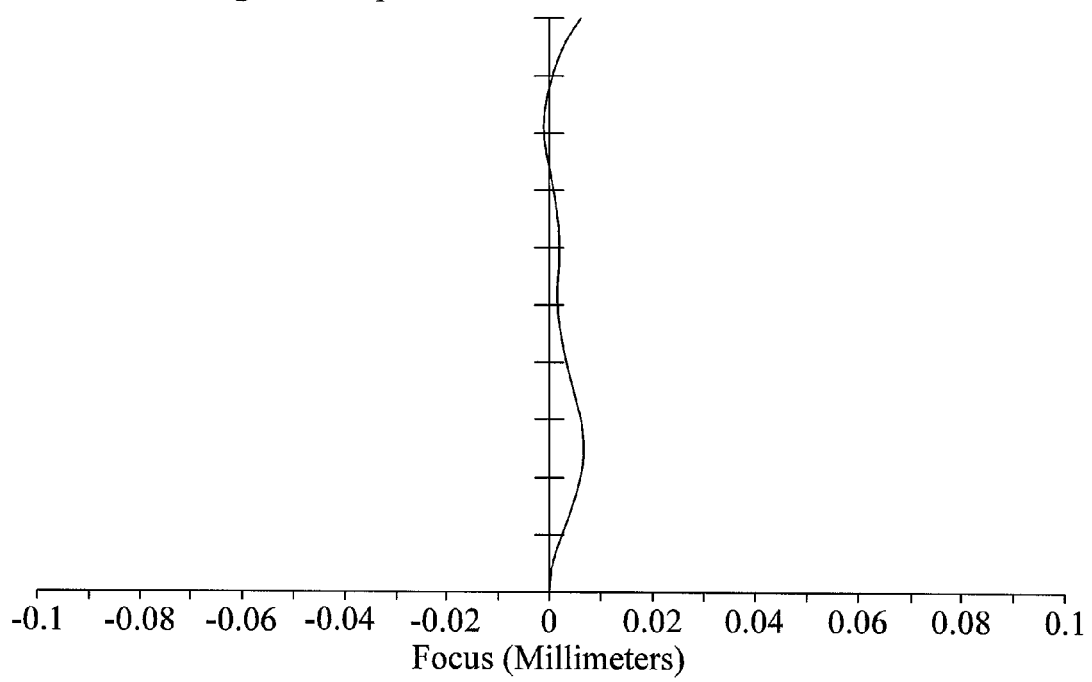
FIG. 4C is a curve diagram of the spherical aberration of the third embodiment of the present disclosure.

According to the basic data of lenses in table five and the aberration curves shown in FIG. 4B and FIG. 4C, the exemplary embodiment of the optical image capture module of the present disclosure has fine compensation for astigmatism, distortion, and spherical aberration.

Figure 5A:
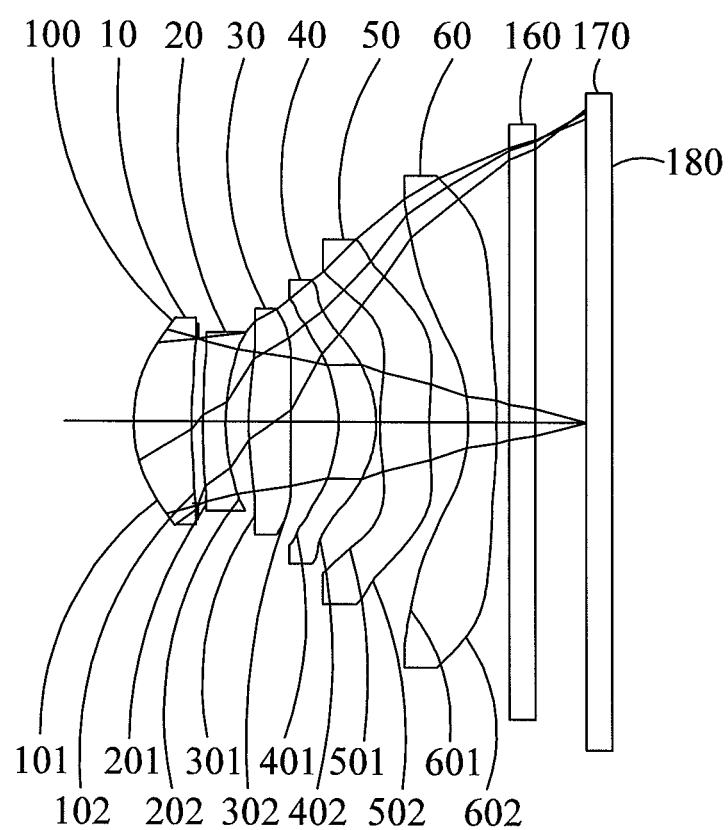
FIG. 5A is a schematic view of a fourth embodiment of the image capture module of the present disclosure.

Please refer to FIG. 5A which is a schematic view of a fourth embodiment of an optical image capture module of the present disclosure. As shown in FIG. 5A, the structure of lenses of the fourth embodiment is similar to that of the first embodiment, but their difference in the optical data shown in table seven and the aperture stop 100 is disposed between the first lens element 10 and the second lens element 20. The object-side surfaces and the image-side surfaces of the first lens element 10 to the sixth lens element 60 are made by the aspheric equation of the equation (1), and their aspheric parameters are shown in table eight.

The most height difference S12H of the sixth lens element 60 approaching the image-side surface and the optical axis being the center and within the diameter range of the aperture stop is 0.031 mm, the most height difference S10H of the fifth lens element 50 approaching the image-side surface and the optical axis being the center and the diameter range of the aperture stop is 0.030 mm, the diameter AD of the aperture stop is 1.314 mm, the focus length f of the optical lens assembly is 2.883 mm, the HFOV which is the half of the maximal field of view of the optical lens assembly, is 39.71°, the distance STL along the optical axis from the aperture stop to the image-side surface of the sixth lens element 60 is 2.362 mm, the distance FL along the optical axis from the object-side surface of the first lens element 10 to the image-side surface of the sixth lens element 60 is 2.871 mm, the distance TTL along the optical axis from the object-side surface of the from first lens element to the image plane is 3.585 mm, the distance BFL along the optical axis from the image-side surface of the sixth lens element 60 to the image plane is 0.713 mm, the diagonal length of an imaging area formed on the image plane by the maximal field of view of the optical lens assembly Dg is 4.936 mm, the central thickness ct2 of the second lens element is 0.178 mm, the sum Σ(ct) of the central thickness of the first lens element, the second lens element, the third lens element, the fourth lens element, the fifth lens element and the sixth lens element is 1.883 mm, the distance T12 along the optical axis from the image-side surface of the first lens element 10 to the object-side surface of the second lens element 20 is 0.087 mm, |S12H/AD|*100=2.36, |S10H/AD|*100=2.28, AD/f=0.456, HFOV/f=13.774, STL/FL=0.823, TTL/BFL=5.028, AD/Dg=0.266, ct2/f=0.062, Σ(ct)/FL=0.656, T12/f=0.030.

TABLE SEVEN basic data of lenses of the fourth embodiment.
Basic data of lenses of the fourth embodiment

| Surface # | | Curvature Radius (mm) | Thickness/Interval (mm) | Index (Nd) | Abbe# (Vd) |
|---|---|---|---|---|---|
| First lens element | First surface | 1.186 | 0.461 | 1.534 | 56.072 |
| | Second surface | 4.422 | 0.048 | | |
| | Aperture stop | ∞ | 0.039 | | |
| Second lens element | Third surface | 3.030 | 0.178 | 1.642 | 22.465 |
| | Fourth surface | 1.442 | 0.184 | | |
| Third lens element | Fifth surface | 2.285 | 0.331 | 1.534 | 56.072 |
| | Sixth surface | 12.027 | 0.378 | | |
| Fourth lens element | Seventh surface | −0.946 | 0.301 | 1.544 | 56.093 |
| | Eighth surface | −0.864 | 0.027 | | |
| Fifth lens element | Ninth surface | 1.519 | 0.389 | 1.534 | 56.072 |
| | Tenth surface | 2.005 | 0.312 | | |
| Sixth lens element | Eleventh surface | −1.384 | 0.223 | 1.544 | 56.093 |
| | Twelfth surface | −6.511 | 0.100 | | |
| Filter | Thirteenth surface | ∞ | 0.210 | 1.516 | 64.167 |
| | Fourteen surface | ∞ | 0.403 | | |

TABLE EIGHT the aspheric parameters of the fourth embodiment

| | Surface # | | | | | |
|---|---|---|---|---|---|---|
| | 1 | 2 | 3 | 4 | 5 | 6 |
| k | −0.5498 | 0.0000 | 0.0000 | −2.3880 | 0.0835 | 0.0000 |
| A | 0.0355 | −0.4408 | −0.9425 | −0.6967 | −0.3529 | −0.0716 |
| B | 0.2505 | 2.5376 | 4.4717 | 3.3483 | 0.7245 | −0.2719 |
| C | −2.4145 | −10.2159 | −14.4909 | −7.6722 | −2.3519 | 0.9564 |
| D | 12.8377 | 30.3949 | 38.077 | 11.9929 | 3.2842 | −3.4236 |
| E | −33.4838 | −56.9285 | −74.0113 | −12.1157 | 1.6837 | 5.9191 |
| F | 43.2114 | 54.2796 | 81.6721 | 5.4078 | −10.2459 | −6.1447 |
| G | −22.2772 | −20.3398 | −38.2987 | 0.9756 | 8.2778 | 3.0383 |
| H | 0 | 0 | 0 | 0 | 0 | 0 |
| J | 0 | 0 | 0 | 0 | 0 | 0 |

| | Surface # | | | | | |
|---|---|---|---|---|---|---|
| | 7 | 8 | 9 | 10 | 11 | 12 |
| k | −0.7916 | −1.4826 | 0.5255 | −1.8172 | −0.4372 | 0.0000 |
| A | 0.7339 | −0.1748 | −1.0807 | −0.7791 | −0.0906 | −0.0505 |
| B | −3.5767 | −0.3524 | 1.3455 | 0.4602 | 0.1347 | 0.2404 |
| C | 8.5107 | 0.9213 | −2.2120 | −0.1431 | 0.1660 | −0.2748 |
| D | −7.2012 | −0.0100 | 3.0831 | −0.0527 | −0.2352 | 0.1509 |
| E | −4.1808 | −0.4997 | −3.5183 | 0.0905 | 0.1126 | −0.0452 |
| F | 10.8891 | 0.1644 | 2.3373 | −0.0317 | −0.0246 | 0.0070 |
| G | −5.0355 | −0.0035 | −0.6072 | 0.0026 | 0.0021 | −0.0004 |
| H | 0 | 0 | 0 | 0 | 0 | 0 |
| J | 0 | 0 | 0 | 0 | 0 | 0 |

Figure 5B:
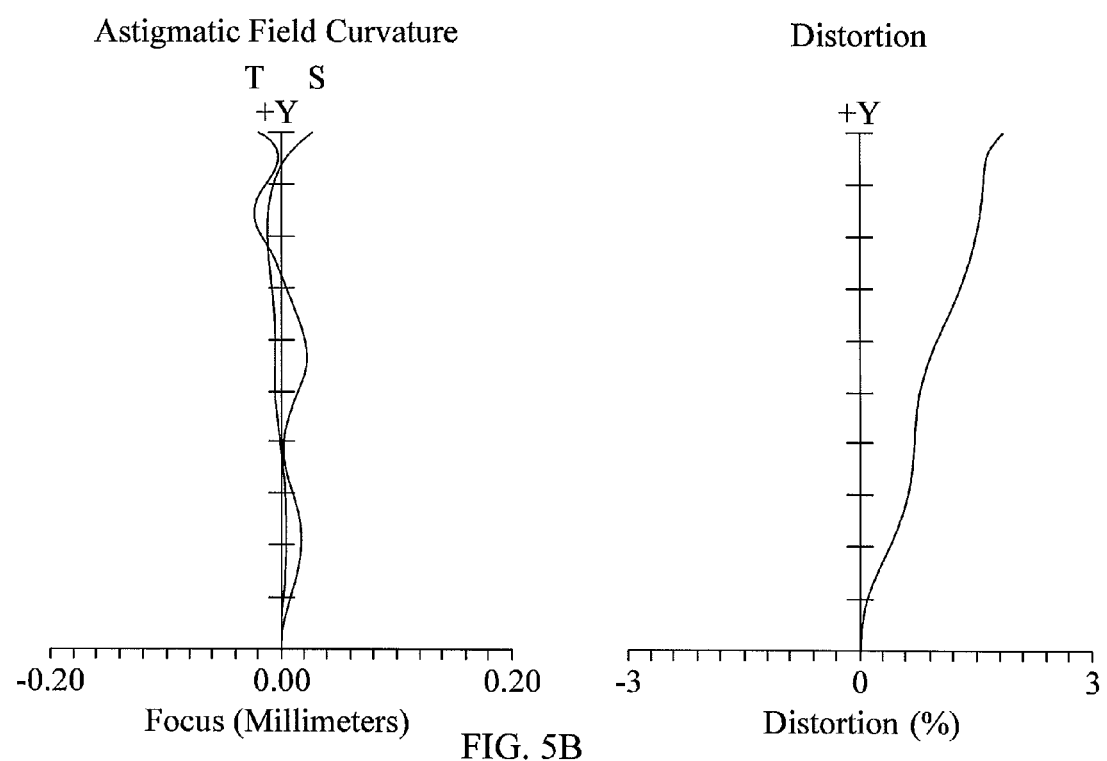
FIG. 5B is a curve diagram of the astigmatism and the distortion of the fourth embodiment of the present disclosure.
Figure 5C:
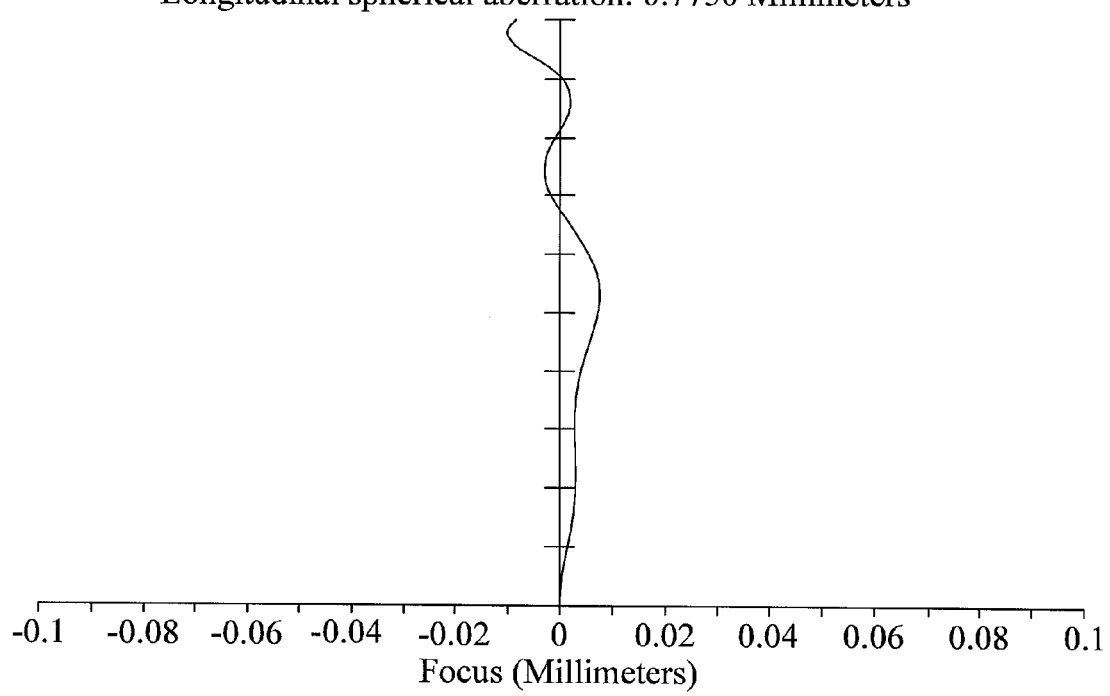
FIG. 5C is a curve diagram of the spherical aberration of the fourth embodiment of the present disclosure.

According to the basic data of lenses in table seven and the aberration curves shown in FIG. 5B and FIG. 5C, the exemplary embodiment of the optical image capture module of the present disclosure has fine compensation for astigmatism, distortion, and spherical aberration.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An optical image capture module, comprising:
   an optical lens assembly, in order from an object side toward an image side comprising:
   a first lens element, having positive refractive power and a convex object-side surface adjacent to the optical axis;
   a second lens element, having refractive power adjacent to the optical axis;
   a third lens element, having refractive power adjacent to the optical axis;
   a fourth lens element, having refractive power adjacent to the optical axis;
   a fifth lens element, having refractive power and a concave image-side surface adjacent to the optical axis; and
   a sixth lens element, having negative refractive power and a convex image-side surface adjacent to the optical axis, at least one of the object-side surface and image-side surface of the sixth lens element is aspheric, and the at least one of the object-side surface and image-side surface of the sixth lens element has at least one inflection point located between the optical axis and the peripheral surface;
   an aperture stop; and
   an image plane, for image formation for an object;
   wherein the most height difference of the sixth lens element approaching the image-side surface and the optical axis being the center, and within the diameter range of the aperture stop is S12H, and the diameter of the aperture stop is AD, and they satisfy the relations:

|S12H/AD|*100<5.0.

2. The image capture module according to claim 1, wherein the focus length of the optical lens assembly is f, and they satisfy the relations: 0.1<AD/f<1.0.

3. The image capture module according to claim 1, wherein the focus length of the optical lens assembly is f, the half of the maximal field of view of the optical lens assembly is HFOV, and they satisfy the relations: 5.0<HFOV/f<20.0.

4. The image capture module according to claim 1, wherein the most height difference of the fifth lens element approaching the image-side surface and the optical axis being the center and within the diameter range of the aperture stop is S10H, and they satisfy the relations: |S10H/AD|*100<4.0.

5. The image capture module according to claim 1, wherein the distance along the optical axis from the aperture stop to the image-side surface of the sixth lens element is STL, the distance along the optical axis from the object-side surface of the first lens element to the image-side surface of the sixth lens element is FL, and they satisfy the relations: 0.5<STL/FL<1.2.

6. The image capture module according to claim 1, wherein the distance along the optical axis from the object-side surface of the first lens element to the image plane is TTL, the distance along the optical axis from the image-side surface of the sixth lens element to the image plane is BFL, and they satisfy the relations: 2.0<TTL/BFL<8.0.

7. The image capture module according to claim 1, wherein the central thickness of the second lens element is ct2 and the second lens element has negative refractive power, the focus length of the optical lens assembly is f, and they satisfy the relations: 0<ct2/f<0.1.

8. The image capture module according to claim 1, wherein the distance along the optical axis from the object-side surface of the first lens element to the image-side surface of the sixth lens element is FL, and a sum of the central thickness of the first lens element, the second lens element, the third lens element, the fourth lens element, the fifth lens element and the sixth lens element is Σ(ct), and they satisfy the relations: 0<Σ(ct)/FL<1.

9. The image capture module according to claim 1, wherein the focus length of the optical lens assembly is f, the distance along the optical axis from image-side surface of the first lens element to the object-side surface of the second lens element is T12, and they satisfy the relations: 0<T12/f<0.1.

10. An optical image capture module, comprising:
an optical lens assembly, in order from an object side toward an image side comprising:
a first lens element, having positive refractive power and a convex object-side surface adjacent to the optical axis;
a second lens element, having refractive power adjacent to the optical axis;
a third lens element, having refractive power adjacent to the optical axis;
a fourth lens element, having refractive power adjacent to the optical axis;
a fifth lens element, having refractive power and a concave image-side surface adjacent to the optical axis, at least one of the object-side surface and the image-side surface of the fifth lens element being aspheric, and at least one of the object-side surface and the image-side surface of the fifth lens element having at least one inflection point located between the optical axis and the peripheral surface; and
a sixth lens element, having negative refractive power and a convex image-side surface adjacent to the optical axis, at least one of the object-side surface and image-side surface of the sixth lens element is aspheric, and the at least one of the object-side surface and image-side surface of the sixth lens element has at least one inflection point located between the optical axis and the peripheral surface;
an aperture stop; and
an image plane, for image formation for an object;
wherein the diagonal length of an imaging area formed on the image plane by the maximal field of view of the optical lens assembly is Dg, the diameter of the aperture stop is AD, and they satisfy the relations: 0.0<AD/Dg<0.5.

11. The image capture module as defined in claim 10, wherein the focus length of the optical lens assembly is f, the half of the maximal field of view of the optical lens assembly is HFOV, and they satisfy the relations: 5.0<HFOV/f<20.0.

12. The image capture module as defined in claim 10, wherein the most height difference of the fifth lens element approaching the image-side surface and the optical axis being the center and within the diameter range of the aperture stop is S10H, and they satisfy the relations: |S10H/AD|*100<4.0.

13. The image capture module as defined in claim 10, wherein the distance along the optical axis from the aperture stop to the image-side surface of the sixth lens element is STL, the distance along the optical axis from the object-side surface of the first lens element to the image-side surface of the sixth lens element is FL, and they satisfy the relations: 0.5<STL/FL<1.2.

14. The image capture module as defined in claim 10, wherein the distance along the optical axis from the object-side surface of the first lens element to the image plane is TTL, the distance along the optical axis from the image-side surface of the sixth lens element to the image plane is BFL, and they satisfy the relations: 2.0<TTL/BFL<8.0.

15. The image capture module as defined in claim 10, wherein the central thickness of the second lens element is ct2 and the second lens element has negative refractive power, the focus length of the optical lens assembly is f, and they satisfy the relations: 0<ct2/f<0.1.

16. The image capture module as defined in claim 10, wherein the distance along the optical axis from the object-side surface of the first lens element to the image-side surface of the sixth lens element is FL, and a sum of the central thickness of the first lens element, the second lens element, the third lens element, the fourth lens element, the fifth lens element and the sixth lens element is Σ(ct), and they satisfy the relations: 0<Σ(ct)/FL<1.

17. The image capture module as defined in claim 10, wherein the focus length of the optical lens assembly is f, the distance along the optical axis from image-side surface of the first lens element to the object-side surface of the second lens element is T12, and they satisfy the relations: 0<T12/f<0.1.

18. An optical image capture module, comprising:
an optical lens assembly, in order from an object side toward an image side comprising:
a first lens element, having positive refractive power and a convex object-side surface adjacent to the optical axis;
a second lens element, having negative refractive power adjacent to the optical axis;
a third lens element, having refractive power adjacent to the optical axis;
a fourth lens element, having refractive power adjacent to the optical axis;
a fifth lens element, having refractive power and a concave image-side surface adjacent to the optical axis, at least one of the object-side surface and the image-side surface of the fifth lens element being aspheric, and at least one of the object-side surface and the image-side surface of the fifth lens element having at least one inflection point located between the optical axis and the peripheral surface; and
a sixth lens element, having negative refractive power and a convex image-side surface adjacent to the optical axis, at least one of the object-side surface and image-side surface of the sixth lens element is aspheric, and the at least one of the object-side surface and image-side surface of the sixth lens element has at least one inflection point located between the optical axis and the peripheral surface;
an aperture stop; and
an image plane, for image formation for an object;
wherein the focus length of the optical lens assembly is f, the half of the maximal field of view of the optical lens assembly is HFOV, the diameter of the aperture stop is AD, the diagonal length of an imaging area formed on the image plane by the maximal field of view of the optical lens assembly is Dg, the most height difference of the sixth lens element approaching the image-side surface and the optical axis being the center and within the diameter range of the aperture stop is S12H, and they satisfy the relations:

$5.0 < HFOV/f < 20.0$, $0.1 < AD/f < 1.0$, $0.0 < AD/Dg < 0.5$, $|S12H/AD|*100 < 5.0$.

19. The image capture module according to claim 18, wherein the distance along the optical axis from the aperture stop to the image-side surface of the sixth lens element is STL, the distance along the optical axis from the object-side surface of the first lens element to the image-side surface of the sixth lens element is FL, and the distance along the optical axis from the object-side surface of the first lens element to the image plane is TTL, the distance along the optical axis from the image-side surface of the sixth lens element to the image plane is BFL, and they satisfy the relations:

$2.0 < TTL/BFL < 8.0$, $0.5 < STL/FL < 1.2$.

20. The image capture module according to claim 18, further comprising an electronic image sensor disposed at the image plane.

\* \* \* \* \*